Aug. 12, 1969 J. A. FITZMAURICE ET AL 3,461,301

REFERENCE SYMBOL CHANGER FOR CHARACTER RECOGNITION DEVICE

Filed Dec. 9, 1965 3 Sheets-Sheet 1

INVENTORS
JOHN A. FITZMAURICE
WILLIAM VAUGHAN
BY
Morse, Altman & Oates
ATTORNEYS Aug. 12, 1969 J. A. FITZMAURICE ET AL 3,461,301

REFERENCE SYMBOL CHANGER FOR CHARACTER RECOGNITION DEVICE

Filed Dec. 9, 1965 3 Sheets-Sheet 2

INVENTORS
John A. Fitzmaurice &
BY William Vaughan
Morse & Altman
Attorneys

REFERENCE SYMBOL CHANGER FOR CHARACTER RECOGNITION DEVICE

Filed Dec. 9, 1965 3 Sheets-Sheet 3

INVENTORS
John A. Fitzmaurice &
BY William Vaughan
Morse & Altman
Attorneys

1

3,461,301
REFERENCE SYMBOL CHANGER FOR CHARACTER RECOGNITION DEVICE

John A. Fitzmaurice, Arlington, and William Vaughan, Weston, Mass., assignors to Baird-Atomic, Inc., Cambridge, Mass., a corporation of Massachusetts Continuation-in-part of application Ser. No. 104,954, Apr. 24, 1961. This application Dec. 9, 1965, Ser. No. 528,669
Int. Cl. G01n 21/30
U.S. Cl. 250—219 5 Claims

ABSTRACT OF THE DISCLOSURE

In an electro-optical print reading or character recognition system a rotatable disc is mounted to intercept the optical projection path and bring to bear selected transparencies mounted in spaced relation about the periphery of the disc. Each transparency carries a group of alphanumeric characters, each group being of a different distinct type font by which a match may be made with an unknown alpha-numeric character projected along the optical path.

Figure 1:
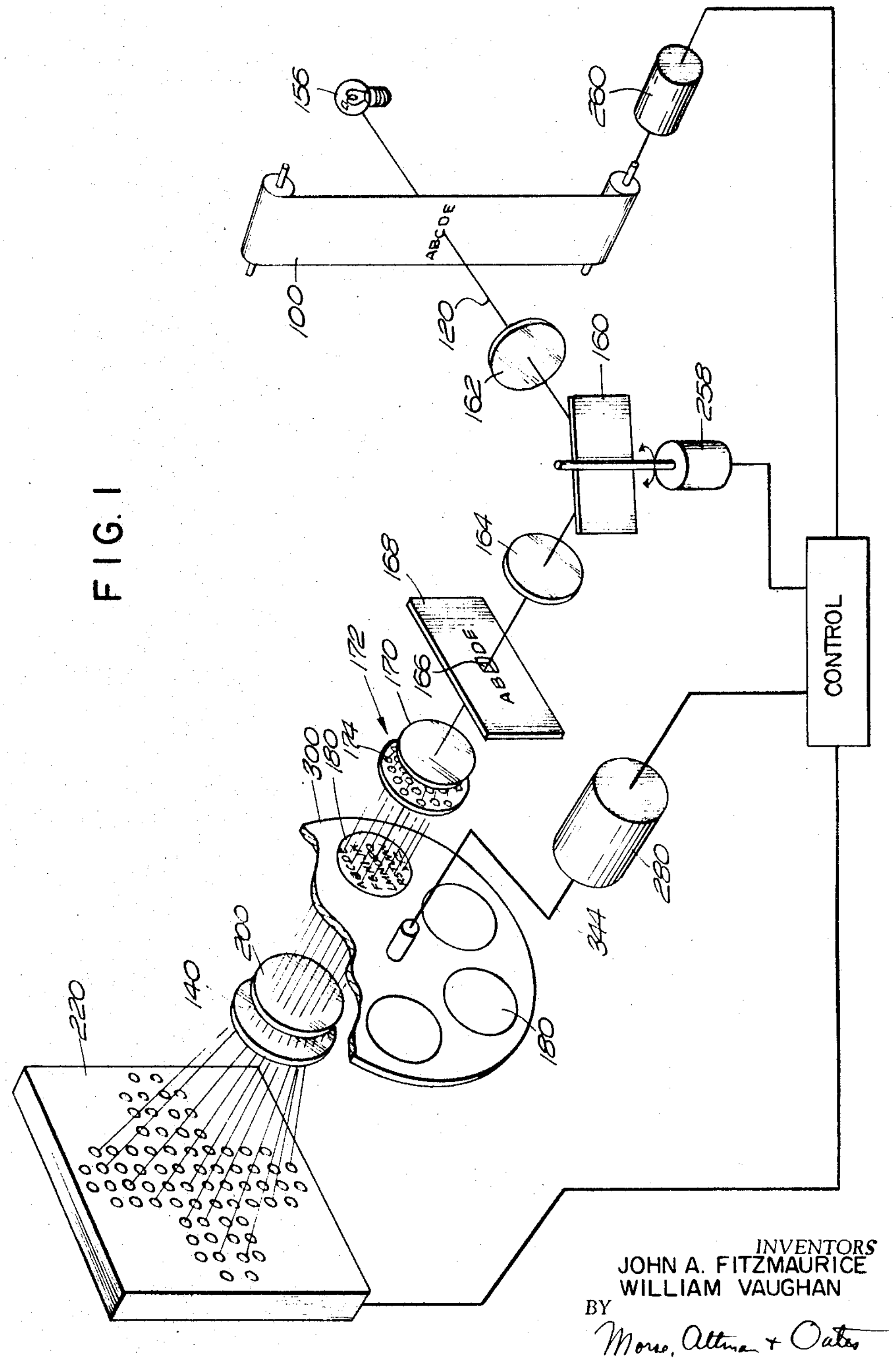

This application is a continuation-in-part of U.S. application Ser. No. 104,954 filed Apr. 24, 1961, under the same title and now abandoned.

This invention relates in general to character recognition systems and more particularly concerns a novel apparatus for changing reference symbols in an electro-optical print reader wherein unknown characters are recognized by comparison with known characters.

In character recognition devices, such as electro-optical print readers, unknown visual intelligence symbols (letters, numerals, etc.) may be identified by a simultaneous comparison of such symbol with an array of known reference representations. In a system of the sort disclosed in U.S. Patents Nos. 2,933,246 and 3,124,636, the recognition involves translating an unknown visual representation into a usable electric signal. This translation may be achieved by means of an electro-optical system which includes a light source, a lens system, an array of known reference characters and an array of photodetectors.

In practice, several elements of the system are spaced along the lens axis in such a manner that the image of the unknown character is passed through each character appearing on the array of known characters to a corresponding photocell array. The resulting electric signals from the photocells thereby bear a predetermined special correlation to the unknown character.

Since the identification or recognition of unknown reference characters in an apparatus of this sort is based upon a comparison of the known with the unknown, it becomes critical that the known reference character be of the same design as the unknown. For example, if the symbols to be identified comprise numerals or alphabet letters of a particular type font, the array of known reference characters should be of the same type font. Furthermore, if the subject matter which is to be recognized involves a printed text made up of several type fonts, the apparatus should be capable of automatically adjusting to variations in type font as they occur.

Accordingly, it is an object of the present invention to provide in a character recognition device means for automatically adjusting to changes in the size and style of the intelligence symbols which are being identified.

Another object of this invention is to provide a novel type font changer for a character recognition system whereby a plurality of different type fonts may be automatically and successively positioned for comparison with the unknown symbols.

2

More particularly this invention features a rotatable disc carrying about its periphery groups of reference characters, each group being of a different distinct type font. According to the invention, all of the characters of one preselected group are simultaneously compared with one unknown character. Should the unknown character be of a type font different from that of the group with which it is being compared then that character obviously could not be identified. It is therefore a function of the disc to rotate in response to a signal and bring to bear succeeding groups of reference characters for comparison with the unknown character. Identification will take place when a group of reference characters having the proper type font is indexed into position.

Figure 2:
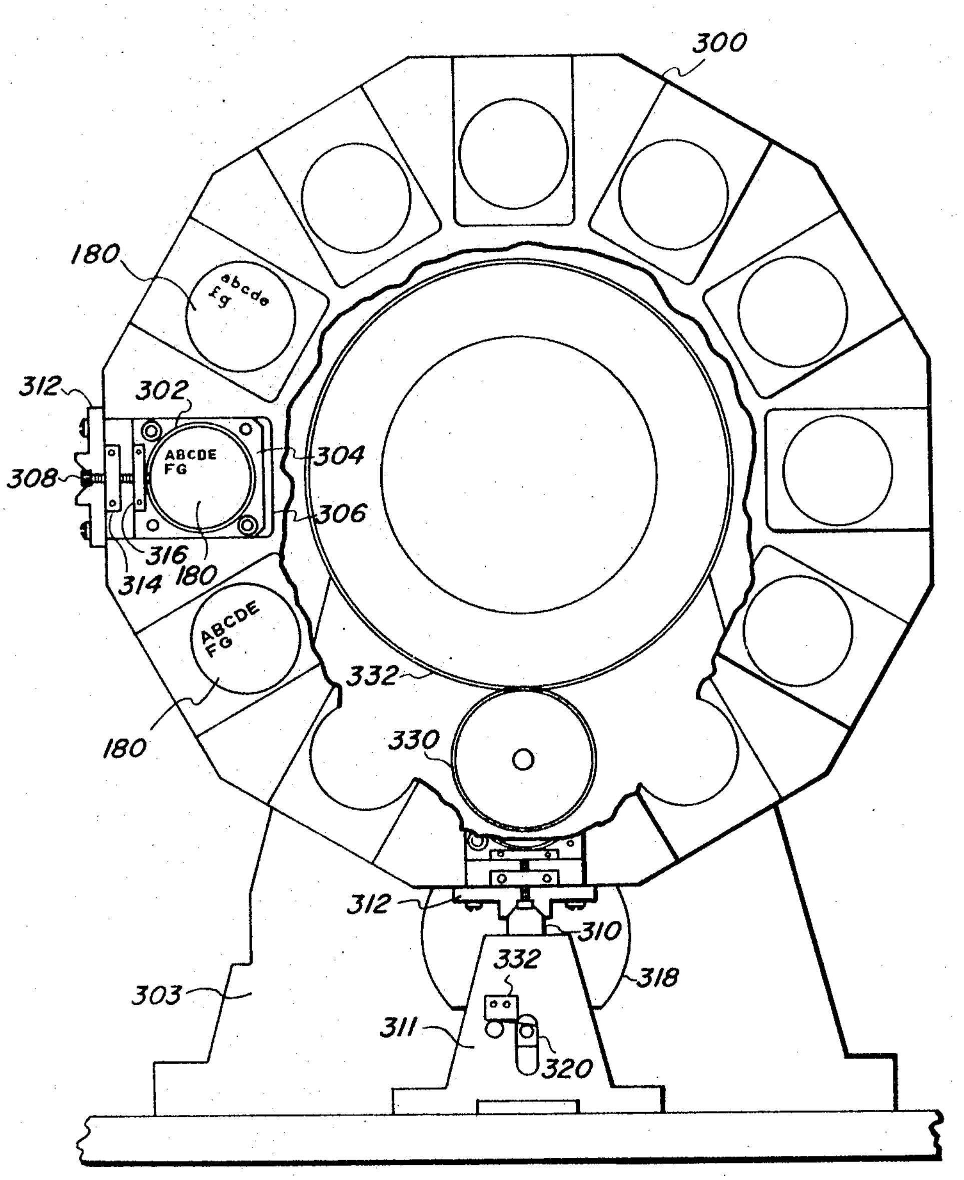
Figure 4:
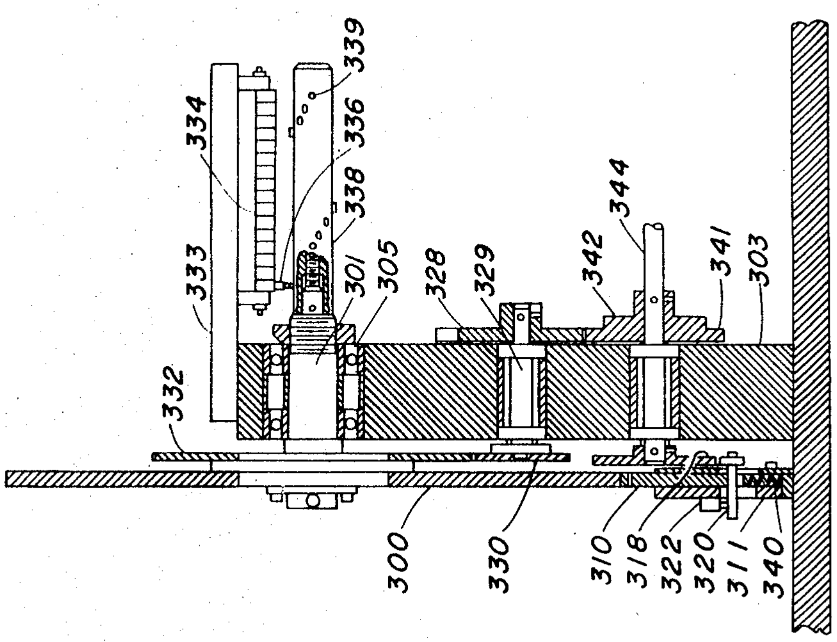
Figure 3:
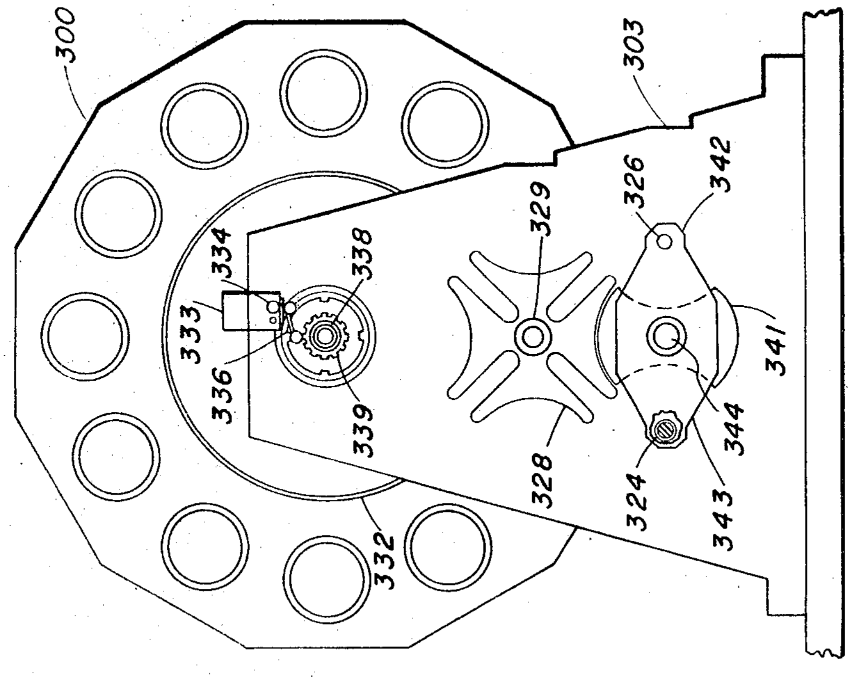

These and other features of the invention along with further objects and advantages thereof will become more fully apparent from the following detailed description with reference being made to the accompanying drawings, in which:

FIG. 1 illustrates a preferred embodiment of the invention, partly in mechanical perspective and partly in electrical block diagram, FIG. 2 is a view of the type font changer in front elevation with portions broken away to show details of construction, FIG. 3 is a rear elevation of the type font changer, and FIG. 4 is a sectional view in side elevation of the device shown in FIGS. 2 and 3.

Referring now to FIG. 1 of the drawings, reference character 100 indicates a film strip bearing unknown intelligence characters or symbols such as printed textual matter comprising letters and numerals which may include different type fonts. Means are provided to position the film with a line of text intersecting an axis 120 of a lens 140 so that the unknown characters of the line may be scanned in a manner to be described below.

A light source, such as a lamp 156 located behind the film strip 100, is adapted to project a row of unknown characters on the film along a projection path against an oscillating mirror 160 mounted between lenses 162 and 164. The row of unknown characters is moved horizontally past an opening 166 in a mask 168 so that each unknown character is projected in sequence through the opening. Each character appearing at the opening 166 is projected against a lens 170 behind which is mounted an array 172 of small lenses 174. The array of small lenses produce multiple repeat images of the particular character at the opening 166 and these repeat images are projected simultaneously along a plurality of projection paths against an array 180 of known reference characters for simultaneous comparison therewith. The superimposed known and unknown characters are projected in an array along a plurality of projection paths through lenses 140 and 200 against an array of photodetectors 220, each detector responding to an individual pair of superimposed characters.

Should it happen that the unknown reference character is similar in style to those of the array with which it is being compared then the particular unknown character will be identified, assuming, of course, that there is a corresponding reference character present in the array. Upon recognition an output signal will be transmitted from the photodetectors to a control center 240 which, in turn, will signal a mirror servo mechanism 258 to move the mirror 160 angularly so as to move the next unknown character into the opening 166 where it may be compared with the array of known characters. When th entire line has been identified, the control center will signal a servo-mechanism 260 to advance the film strip 100 so that succeeding textual matter in the next line may be identified. It will be understood that the oscillating mirror 160 scans the text line on the film strip 100 so that adjacent characters may be rapidly identified in order.

In the event that the type fonts of the known and unknown reference characters are dissimilar, identification cannot be achieved and the control center 240 will energize a drive motor 280, coupled to a type font disc 300, causing the disc to cycle through its several positions.

The disc 300 carries several arrays 180 with each array consisting of a complete set of alphanumeric reference characters. While all of the several arrays are similar as regards their symbolic meaning, they are all dissimilar in that each array has its own distinct type font. The several arrays are disposed about the periphery of the disc 300 and it will be understood that any one of the arrays may be moved across the optic axis by selective rotation of the disc. With such an apparatus the several arrays may be compared successively with the unknown character until the array having a type font corresponding to that of the unknown character is brought into position. Assuming that a like symbol is present in the array, the unknown character will then be identified.

Referring now more particularly to FIGS. 2–4, the disc 300 is shown as having an axle 301 rotatably mounted to a fixed frame 303 by means of ball bearings 305. Preferably the disc 300 should be polyhedral, as shown, rather than circular, with an array 180 of reference characters located adjacent each face of the polyhedron.

For purposes of illustration, the disc 300 is shown as having twelve faces and carrying a like number of arrays 180. Typically, the disc has a radial recess 306 formed into each flat face with each recess adapted to receive a holder 304. The holder in turn has a central opening in which is mounted a transparency 302 bearing an array of reference characters 180. As suggested in FIG. 2, each array has its own distinctive type font so that twelve arrays of different size and style are available for comparison with the unknown character. The holder may be radially positioned within the slot by rotation of an adjustment screw 308 which is held in a fixed bracket 314 mounted on the face of the disc 300. The inner end of the screw 308 is in threaded engagement with a follower 316 which in turn is fastened to the holder 304. This feature of the invention allows for precise radial positioning of the holder with respect to the axis of rotation of the disc 300.

As already indicated above, one of the twelve transparencies 302 will be initially positioned in the optical system of FIG. 1. The initially positioned transparency, with its array of reference characters of a particular type font, normally will remain in position until an unknown character on the film strip 100 cannot be identified. Should any of the characters not be identified, the control center 240 will cause the disc 300 to rotate into a position where a new transparency of different type front may be compared with the character not identified.

Rotation of the disc and comparison of successive arrays with the unidentified characters will be repeated until all of the characters in the line are identified. If a character is still unidentified after a full cycle of the disc, a visual signal will alert the operator. The operator will then view the line of text, locate the non-recognized character and manually insert the character into the print reader. A memory system, not part of this invention, may be employed to record recognized characters and to signal through the control center when all of the characters in a line are identified.

An indexing mechanism has been provided so that each transparency, as it is rotated into the optic system, will be precisely located relative to the system. This indexing mechanism includes a pin 310 mounted for reciprocation within a standard 311 and urged into normally upward position by means of a spring 340. The upper end of the pin seats into the notch of the block 312, thereby locking the disc 300 against rotation and aligning the selected transparency for comparison.

When the disc 300 is to be indexd to a new position, the pin 310 is depressed by means of the lobe of a cam 318 bearing against a cross bar 320 carried by the pin 310. A micro switch 322 may be mounted on the standard 311 to detect the position of the pin and to provide an electrical interlock for the control system.

The cam 318 is carried by a drive shaft 344 rotatably mounted through the frame 303 and adapted to be driven by the motor 280 of FIG. 1. In addition to the cam 318, the drive shaft 344 also supports an intermittent drive wheel 342 comprising a locking cam portion 341 and a plate portion 343 carrying a pair of driving pins 324, 326. When the shaft 344 is rotated, one of the pins 324, 326 will drivingly engage with a slot of a Geneva wheel 328 as the cam portion 341 rotates out of locking engagement with a complementary arcuate portion of the Geneva wheel.

The Geneva wheel is keyed to a shaft 329 which also carries a gear 330. The gear 330 meshes with a pinion 332 which in turn is drivingly connected to the disc 300. With the above apparatus, the disc 300 will be rotated 30° for each 180° of drive shaft rotation and will include a dwell period during which time comparison of the unknown character with the indexed array may be carried out. In order to accommodate an increase or decrease in the number of transparencies employed quite obviously the gear ratio may be altered in such a manner that the indexing will be properly executed.

A bracket 333, mounted on the top of the frame 303 and extending rearwardly therefrom, supports a bank of switches 334. Each switch has a follower 336 which rides against a shaft 338 extending coaxially from the axle 301. For the sake of clarity, only one of the followers has been illustrated in FIG. 4. A series of bosses 339 are arranged spirally about the shaft 338, each boss being located in the path of a different one of the reference transparencies 302. It will be readily apparent that the bank of switches, in cooperation with the shaft 338 and bosses 339, will provide for the control center a constant indication of the position of the disc 300.

From the foregoing description, it will be appreciated that the present invention has greatly increased the utility of character-recognition devices, in that a much wider variety of characters may be processed for purposes of identification than was hitherto possible.

While the invention has been described with particular reference to the illustrated embodiment, it will be understood that numerous modifications may be made by those skilled in the art without departing from the scope and spirit of the invention.

Having thus disclosed our invention, what we claim and desire to obtain by Letters Patent of the United States is:

1. In a system wherein an unknown visual representation may be identified by an electro-optical comparison with an array of known representations, a device for comparing said unknown representation with a plurality of said arrays, comprising a rotatable member, a plurality of radially adjustable transparencies mounted peripherally on said member, each of said transparencies bearing an array of reference characters of the same type font and each array having a different type font, means for comparing said unknown representation with each reference character of any array, and intermittent driving means for indexing successive arrays into position for comparison with said unknown representation.

2. A character recognition system, comprising a lens system having an axis, an array of photo detectors spaced along said axis, a film section bearing an unknown visual representation intersecting said axis, a rotatable disc intersecting said axis, a plurality of transparencies mounted about said disc, each of said transparencies bearing an array of reference characters of the same type font and each array having a different type font, intermittent driving means for indexing successive arrays into said axis, a light source adapted to project the image of said unknown representation against one of said arrays through said lens system and against said photo detectors and means to project said image over each character in each array, said visual representation, any selected array of reference characters and said array of photo detectors, when registered, defining a plurality of projection paths, one each of said paths including one each of said reference characters, one each of said photo detectors and said visual representation.

3. A character recognition system according to claim 2, including radially movable mounting means for each of said transparencies for individual adjustment relative to the axis of rotation of said disc.

4. A character recognition system according to claim 2, wherein said disc includes a plurality of switches sequentially actuated by rotation of said disc and adapted to produce a signal indicative of the position of said disc.

5. Apparatus for a character recognition system comprising an optical system defining a projection path, a disc rotatably mounted on said frame, a plurality of transparencies arranged about said disc, each of said transparencies bearing an array of reference characters of the same type font and each array having a different type font, intermittent driving means for indexing successive transparencies into said system, locking means mounted on said frame and adapted to temporarily engage said disc to hold it in a fixed rotational position, and means to project an unknown character over each reference character in each array.

References Cited

UNITED STATES PATENTS

| | | | |
|---|---|---|---|
| 2,985,366 | 5/1961 | Scarrott | 340—146.3 X |
| 3,333,244 | 7/1967 | Brown | 340—146.3 |

MAYNARD R. WILBUR, Primary Examiner

J. M. THESZ, Assistant Examiner

U.S. Cl. X.R.

340—146; 356—71